UNITED STATES PATENT OFFICE.

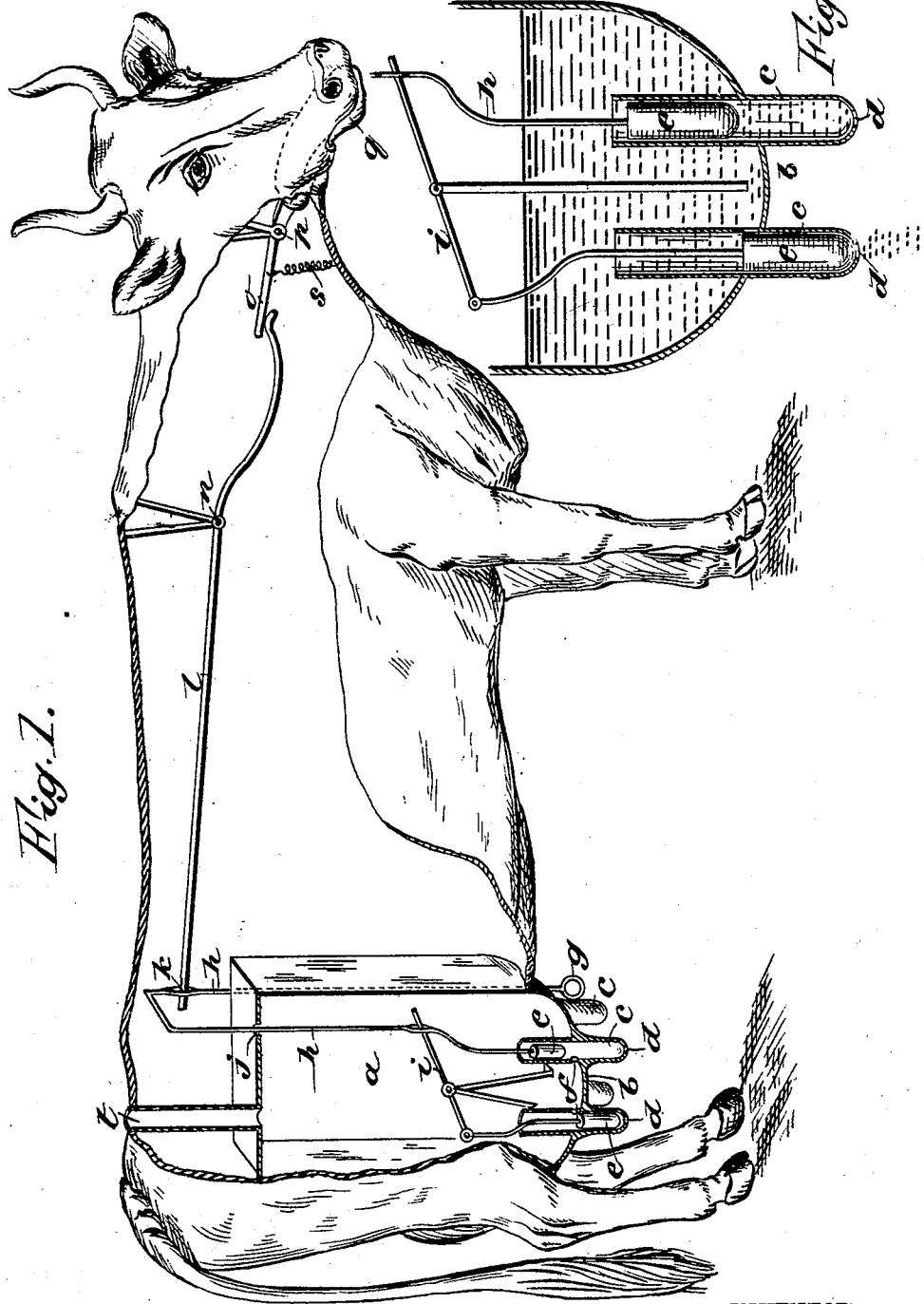

WILLIAM H. MANTZ AND ROBERT BLUM, OF MOUNT VERNON, ILLINOIS.

TOY MILCH COW.

SPECIFICATION forming part of Letters Patent No. 275,053, dated April 3, 1883.

Application filed February 16, 1883. (No model.)

*To all whom it may concern:*

Be it known that we, WILLIAM H. MANTZ and ROBERT BLUM, of Mount Vernon, in the county of Jefferson and State of Illinois, have invented a new and Improved Toy Milch Cow, of which the following is a full, clear, and exact description.

Our invention consists of a tank, forming the udder of the figure of a cow, for containing milk, to be poured in through a pipe, with syringe-pump teats projecting from the bottom of the tank, in which plungers are fitted to eject the milk, the plungers being connected to a working-rod, which extends down through the udder, to be worked by the milker as if manipulating the teats; and our invention also consists of contrivances connected with the working-rod by which the milk is ejected, which cause the under jaw of the figure to work in the manner of a cow chewing her cud while being milked, all as hereinafter fully described.

Reference is to be had to the accompanying drawings, forming part of this specification, in which similar letters of reference indicate corresponding parts in both the figures.

Figure 1 is a side elevation of the figure of a cow, with parts in section, showing our improved toy milch-cow apparatus. Fig. 2 is a sectional elevation of the milk-tank and syringe-ejectors.

We arrange a tank, $a$, within the shell of a toy cow, with its lower end, $b$, occupying the place and being in the form of the udder of a cow, and having syringe-pump extensions $c$, in the form of teats, which are perforated at the lower ends for the discharge of the milk at $d$, in which we fit plungers $e$ for ejecting the milk which is to be received into said teats at $f$, also at the upper ends when high enough in the tank, when the plungers are worked by the handle $g$ of a rod, $h$, to which said plungers are connected, one being connected directly to the rod and the other to a lever, $i$, that is connected with said rod; and the rod passes through the top of the tank for a guide at $j$, and thence extends down through the body of the cow at the udder, where the handle $g$ is to be worked by a person occupying the same position with relation to the cow and making about the same motions as in the natural operation.

At $k$ the working-rod of the pump connects with a lever, $l$, that extends forward into the neck of the cow, and is suspended on a fulcrum, $n$, in suitable connection with a lever, $o$, on a fulcrum-pivot, $p$, and connected with the lower jaw, $q$, and having a reacting-spring, $s$, by which the working of the pump-rod also works the jaw as the cow does in chewing the cud, or substantially so. $t$ represents the tube by which the milk is supplied to the tank.

We do not limit ourselves to the particular contrivance of the pump and working-rods and levers herein represented, for they may be varied at the pleasure of the constructer.

Having thus described our invention, what we claim as new, and desire to secure by Letters Patent, is—

1. In a toy cow, a tank, $a$, representing the udder, and having teats $c$, provided with an ejecting pump or pumps, with a suitable connecting-rod for ejecting milk from the tank, substantially as described.

2. In a toy cow, a tank, $a$, representing the udder, and having teats $c$, provided with an ejecting-pump having a working-rod with a handle, $g$, arranged, with relation to the udder, to be worked in the manner of milking the cow, substantially as described.

3. In a toy cow having a milk-holding tank representing the udder of a cow, and provided with syringe-pump teats $c$, the duplicate pumps $c\ e$, working-rod $h\ g$, and lever $i$, combined and arranged with the said tank, substantially as described.

4. In a toy cow having a milk-holding tank representing the udder of a cow, and provided with ejecting-pumps and a working-rod, the movable jaw of the figure also connected with the working-rod and being operated thereby, substantially as described.

5. The combination of levers $l\ o$ and spring $s$ with the movable jaw $q$ of a toy cow, and with the working-rod $h$ of a milk-ejecting pump connected with the udder-tank $a\ b$, substantially as described.

WILLIAM HENRY MANTZ.
ROBERT BLUM.

Witnesses:
WILLIAM DREW TABB,
ROBERT N. HINMAN.